July 31, 1962 L. PATELLA 3,046,677
METHOD AND MEANS FOR REPRODUCING IN A PERFECTLY CORRECT
MANNER TERRESTRIAL AND CELESTIAL MAPS
Filed June 28, 1960 6 Sheets-Sheet 6

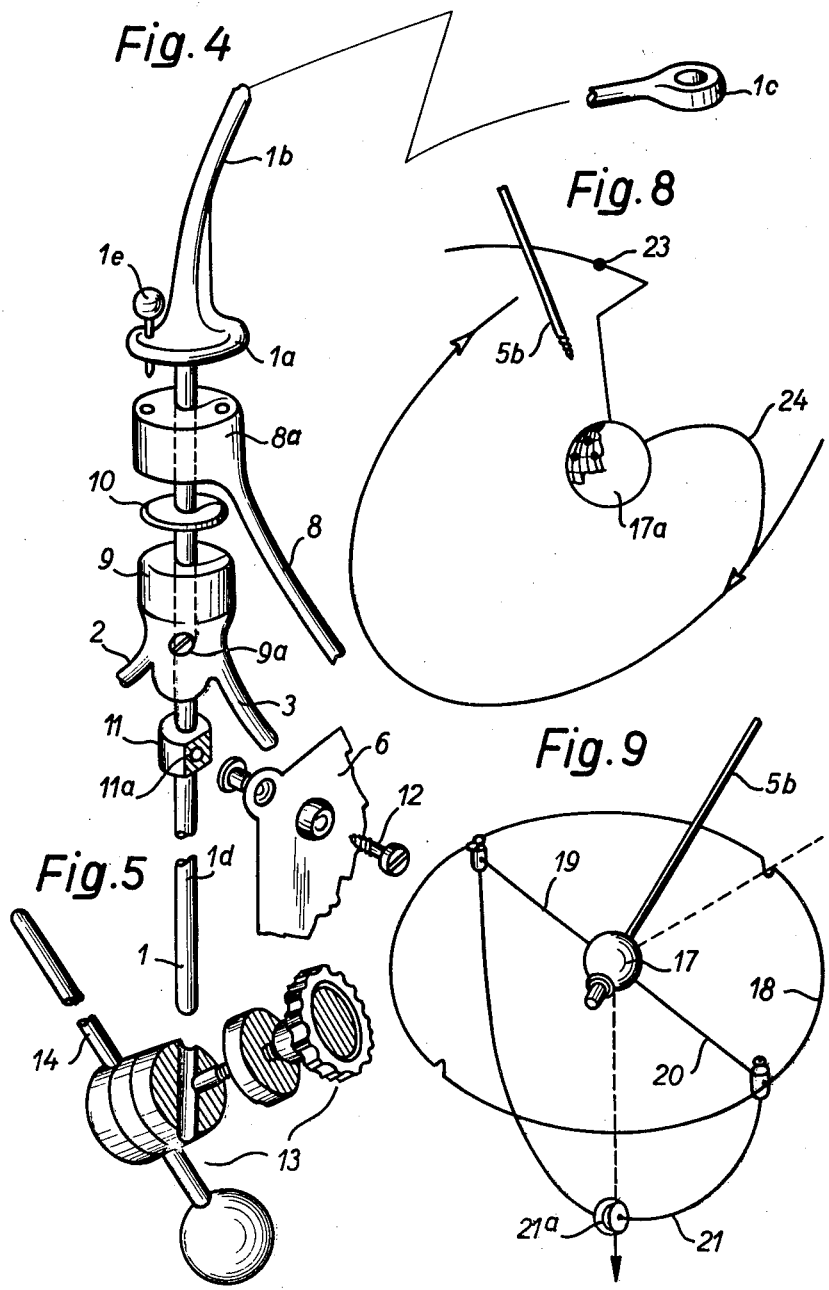

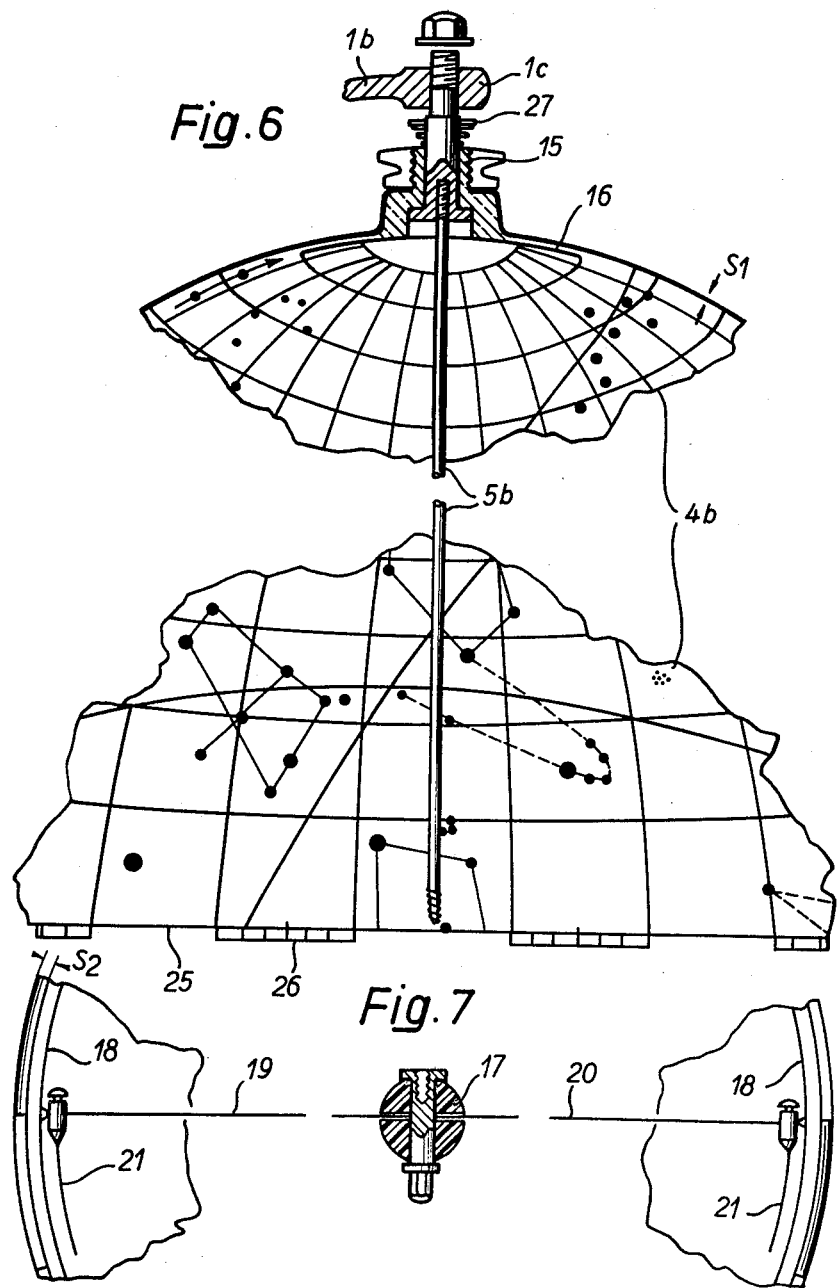

United States Patent Office 3,046,677
Patented July 31, 1962

3,046,677
METHOD AND MEANS FOR REPRODUCING IN A PERFECTLY CORRECT MANNER TERRESTRIAL AND CELESTIAL MAPS
Luigi Patella, % Realization Industriales Technia S.A., Montevideo, Uruguay
Filed June 28, 1960, Ser. No. 39,322
Claims priority, application Switzerland June 29, 1959
4 Claims. (Cl. 35—47)

The invention relates generally to a globe on which terrestrial and celestial maps can be inscribed and more particularly to a globe on which terrestrial and celestial maps can be simultaneously arranged to represent relations therebetween as they actually occur in nature.

Since the most remote times, celestial globes have been used to represent the appearance of the heavens and have been forerunners of terrestrial globes used to represent the appearance of the earth. The celestial globes have a considerable historical and aesthetic value as testimonials of Graeco-Roman, Arabic and Renaissance general knowledge of astronomy. Terrestrial globes from times of great geographical discoveries to the present days more accurately and specifically disclose advances made in the field of cartography.

Representation of the earth's surface on the outer surface of a globe is but well-known, accurate and immediately understood, but the same cannot be said in the case of celestial globes when the stars are similarly represented on the outer surface of a sphere. Such star representation on various modern celestial globes is unnatural and prevents a correct angular setting of the globe.

When looking at the actual stars in the sky, the observer is exactly at the center of an imaginary celestial hemisphere corresponding to the location of the observer at the time of observation, while the observer of a conventional celestial globe has to imagine himself at the center of a globe, in order for conditions to be similar to those of the stars in the sky.

Thus a geographical representation is correctly executed on the outer surface of a globe or, more accurately of a geoid, while a celestial representation of the stars is correctly executed on the inner concave surface of a sphere. However, as the relative positions of the stars with respect to the earth's surface change according to the time and place of observation, it is necessary that these changes also be effected on globe surfaces in order to faithfullly respect the actual conditions of the real objects represented.

My invention has for its object, either or both, terrestrial and celestial representations on a single globe, the representations being entirely accurate with the celestial and terrestrial phenomena at the respective times and places of observation.

The development of long-range aerial lines with high speeds of flight, in particular the transpolar lines, and the interest in all parts of the world engendered by the mass media of communication, the study of geography has already undergone a considerable transformation and can no longer be considered apart from the development of space. Geography should be prepared to consider and to show the earth, no longer within the restricted range of the solar system, but with reference to the heavens. The representation should correctly portray observed phenomena and all arbitrary and conventional representations corrected to rectify any misrepresentation engendered thereby.

A well-defined cosmic representation must satisfy the following requirements: for any point and time of observation belonging to the northern or southern hemisphere of the earth, it is always necessary to make the poles of the representation of the celestial sphere face the celestial poles and lie in alinement therewith, so as not to give a misrepresentation of reality.

The object of my present invention consists in providing an angular setting of the poles corresponding to the time and place of observation for the geographical and/or celestial representations. As hereinafter described together with an apparatus for obtaining the angular setting, and thereby providing an accurate representation of the observed phenomena.

In the southern hemisphere where the celestial South Pole is to be considered as the upper Pole, the terrestrial South pole should be set in a raised position at a point corresponding to the latitude of the point of observation. The conventional terrestrial globes now in use provide the opposite for southern latitudes where the North Pole is always shown in a raised position as if the observer were still in the northern hemisphere. The observation of a geographical globe under such conditions in South America, South Africa, Australia, etc., is as arbitrary as to study in a northern latitude the northern hemisphere on a globe in which the South Pole is in a raised position. This would be absurd and my invention has for its main object the correction of an obviously erroneous custom which remains erroneous even when explained.

A fortunate practical consequence of the cosmic representation of my invention provides that the continents and the oceans of the entire southern hemisphere benefit by an unusual visibility and the actual antartic cap, instead of being concealed as in all conventionally fitted terrestrial globes, is readily visible. Such favorable conditions are provided for any northern or southern latitude, because the area of major interest lies always in the upper section of the globe which is fully apparent and readily visible. It should be remarked that the frequent fitting of the conventional terrestrial globes with a constant slope of their axis at 23° 27′ may be considered as a slight attempt towards the angular setting provided by my invention. However, these prior attempts lead to failure in current practice, because such an unvarying slope, instead of being referred, as should be, to the unvarying plane defined by the orbit of the earth, is actually related to the horizontal plane at the point of observation, e.g. to the surface of the table on which the support of the globe rests. Thus, the unvarying cosmic setting of the plane containing the orbit of the earth is mistakenly replaced by the horizon at the point of observation, which point is, of course, variable. Only the integral application of the idea of a cosmic representation and its accurate application to an angular setting for both northern and southern hemispheres leads to the true and single solution which makes the representation conform with observed phenomena.

The accuracy of the principle disclosed and its validity are obvious, taking into account that, when associating celestial and geographical representations, the celestial representation is that which requires an adjustment of the angular setting of the corresponding geographical representation, in order to make it conform with observed reality.

It should be observed that the celestial and terrestrial globes provide a substantial ease and efficiency for teaching purposes, together with an undisputable economy in bulk and cost price with improved scientific accuracy, whereby the erroneous solutions provided hitherto are avoided.

It should also be remarked that, in the past, the celestial globes were of interest to a restricted number of students and scientists, but, nowadays, astronomy forms an essential study for a large number of civil and military professions. It is sufficient to mention the investigations relating to spatial, interastral and also stratospheric navigation.

The opportunity for efficient and correct study is undisputable, since a visual and direct stimulus on ground surface for training and investigation purposes is provided, with a view to obtaining an instantaneous and unfailing identification of the stars during flight.

I will now describe my novel celestial and terrestrial globe forming a single object adapted to represent accurately and with accurate angular setting both the terrestrial and celestial spheres with materially coinciding coordinates.

My improved globe is provided with an outer surface in the shape of a geoid representing correctly the surface of the earth and having an inner spherical concave surface representing exactly the celestial sphere. The globe is otherwise characterized by the fact that it is readily disconnected, so as to form two hemispheres, respectively a northern and a southern hemisphere, and it is readily reassembled to form a complete terrestrial globe, by a suitable movement which is an opening and a closing of the celestial and terrestrial globe. In this movement, the equators of the two hemispheres of the globe are shifted away from each other and return into a position in which they register with each other in a plane perpendicular to the axis of rotation of the earth, said hemispheres moving with their equators parallel to said plane until a final position is reached, ensuring direct visibility for the concave celestial hemispheres with the minimum spacing between the parallel centers.

A suitable assembly allowing such a movement constrains the half axes round which the hemispheres rotate to remain during, before and after said movement in parallel with the rotary axis of the earth. Said opening movement of the celestial and terrestrial globe gives a complete and direct visibility of the celestial hemispheres of the globe which are correctly set, without preventing the visibility of the corresponding terrestrial hemispheres of the globe.

The structural subdivision of the terrestrial globe along the equator is not only of advantage for teaching purposes, but it is also of interest for theoretical reasons, since the equator forms a clear and natural line of separation associated with the poles, so as to define the latitudes and to separate climatic areas, the different cultural zones for vegetable and human purposes and the like geographical phenomena.

The importance of the celestial equator and of the celestial poles is also of a basic importance, since they coincide structurally with the corresponding terrestrial equator and poles on each of the globe hemispheres, as described hereinafter.

If the representations of the terrestrial and celestial northern and southern hemispheres are caused to register, it is possible to obtain, through a single angular setting operation, a perfect coincidence of the representations on the four hemispheres with the corresponding cosmic hemispheres. For sake of clarity, I may resort to an example: at Montevideo, the capital of Uruguay, it is necessary to give the half axis of the austral celestial and terrestrial hemispheres an angle of 34° 55′ corresponding to the latitude of the city and, at the same time, said half axis should be set to lie parallel with the rotary axis of the earth, taking care that the South Pole of the representation should be the higher pole.

Thus the globe conforms with the general principle underlying the invention, both in its closed and in its open condition.

The novel angular setting differs from current practice for the southern hemisphere wherein the geographical globes stand and are generally examined upside down. By reason of my cosmic misrepresentation, it is possible to angularly set the hemispheres which are not necessarily the northern and southern hemispheres, to incurved maps and portions thereof and even to simple geographical globes in common use, including all geographical representations that are correct when angularly set according to the sense of said invention.

In order to avoid, for southern latitudes, any turning upside down of my improved celestial and terrestrial or simple terrestrial globe, the writing and the reference numbers of the longitudes and latitudes on each geographical hemisphere should increase towards the upwardly directed pole and appear non-inverted with reference to the corresponding terrestrial equator. For each geographical hemisphere considered, it is thus possible to associate excellent visibility of the areas of interest with an ease of direct reading of the writing and numbers applied to the globe. Such arrangements are essential for the purely geographical representations. For the geographical hemispheres of the celestial and terrestrial representations, I believe it preferable to resort to the opposite arrangement for the celestial hemispheres, so that the writing and the numbers may be turned upside down with reference to the celestial equators, whereby the names of the stars may be more easily read when they lie above the horizon and more especially in their upper transit.

A further advantageous feature of my invention consists in the material coincidence and visual registry between the celestial and terrestrial coordinates, which allows an immediate understanding of the principles associating geography with astronomy, whereby various practical and theoretical problems are solved easily, in particular stratospheric and spatial navigational problems, chiefly as concerns the departure from and return to earth considered in the angular setting.

My invention will now be further described in detail, reference being made to the accompanying drawings given by way of examples and by no means in a limiting sense. In said drawings:

FIG. 4 shows a structural detail of the tripod carrying in an angularly shiftable position the terrestrial and celestial globe.

FIG. 5 illustrates the double pivoting jaw and the small rod carrying a terminal sphere on which the globe bears and may be adjusted with a view to ensuring the correct cosmic angular setting of the axis of said globe.

FIG. 6 illustrates in sectional view a circumpolar area and an equatorial area of the northern celestial hemisphere with the corresponding half axis or spindle and support on which it may rotate, which latter parts form components of the globe.

FIGS. 7 and 9 are structural details of the circle defining the horizon with its counterweight and assembling means including a cardan joint carried by the free end of the half axis round which one of the hemispheres is revolvably carried.

FIG. 8 is a detail view of the auxiliaries defining materially various trajectories and orbits of artificial satellites.

Figure 1:
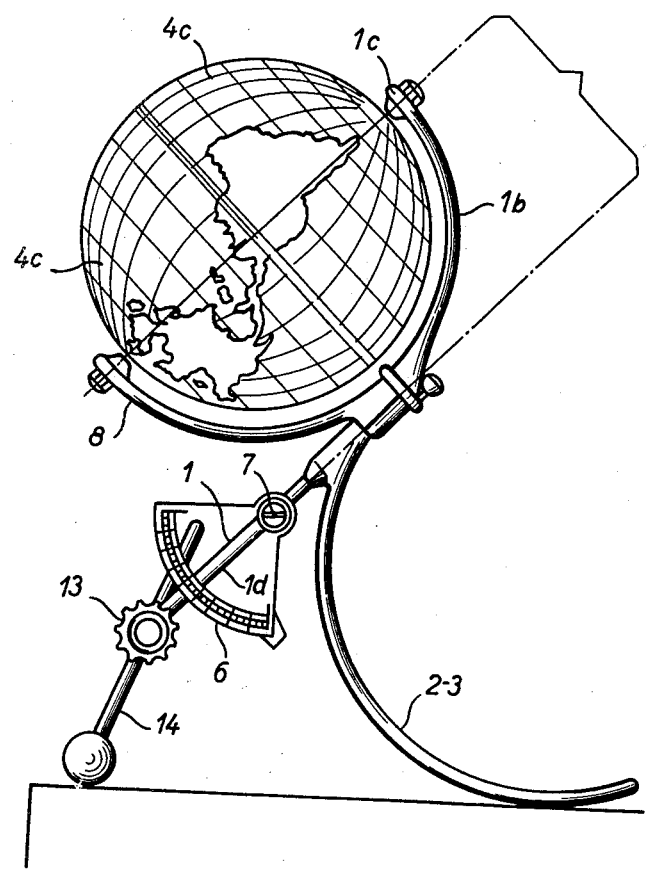
FIG. 1 is a side view of a celestial and terrestrial globe according to my invention, in its accurate angular setting for use in southern latitudes, said figure illustrating as well a simple terrestrial globe executed and angularly set in accordance with my invention.
Figure 2:
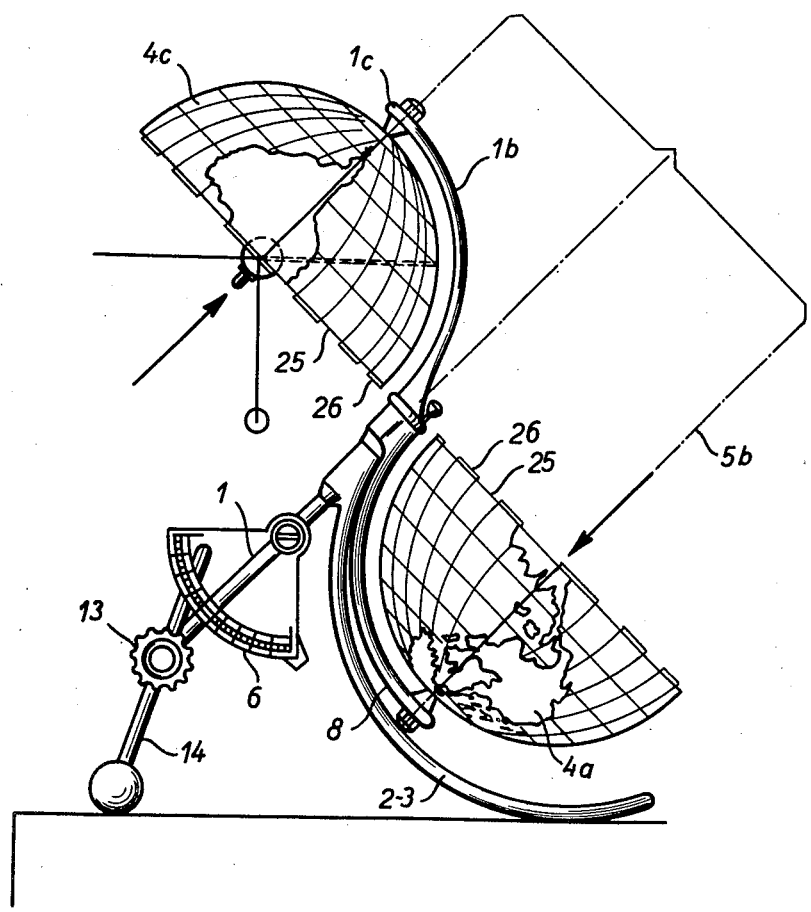
FIG. 2 shows the same celestial and terrestrial globe in its open condition providing complete and direct visibility of the four hemispheres, to wit: two concave celestial hemispheres and two convex geographical hemispheres, the whole arrangement being set for use in southern latitudes.
Figure 3:
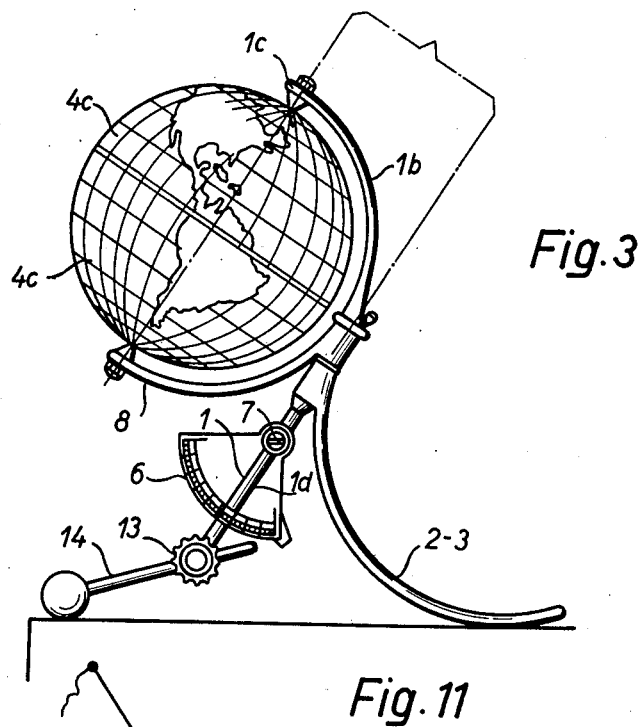
FIG. 3 is a side view of the celestial and terrestrial globe when closed, so as to form a terrestrial globe in its correct and traditional angular setting corresponding to a northern latitude, said figure illustrating as well a simple terrestrial globe executed and angularly set in accordance with my invention.

Turning to FIG. 1, the celestial and terrestrial globe is carried by a support including an upright 1 forming the front foot associated with curvilinear feet 2 and 3. The front foot extends upwardly to form an arcuate stationary arm 1b terminating with an eye 1c adapted to engage and to secure in its proper position the support on which the celestial and terrestrial hemisphere may revolve, the polarity of which is identical with that of the actual hemisphere on which the observer stands. Said support carries the half axis of the selected hemisphere in parallel with the longitudinal axis of the front foot 1.

A second arcuate rotary arm 8 carries in its accurate position the other terrestrial and celestial hemisphere, both in its closed and in its open position. According to the latitude and polarity to be taken into account, other arrangements are possible, which are readily obtainable in accordance with my invention.

To further the checking of the angular setting, the rectilinear foot or upright 1 is provided with a longitudinal line of sight 1d cooperating with the graduations in latitude between 0 and 90° marked on the transparent quadrant 6, which latter is adapted to rock round its center and carries a counterweight in a manner such as will maintain constantly in a horizontal position the line connecting the quadrant center 7 and the zero of the scale on the quadrant 6.

Turning more particularly to FIGS. 4 and 5, it is possible to disclose the assembly of the elements carrying and angularly setting the globe. Over the rectilinear front foot are fitted in succession, through its free end, the following parts: the hub 8a of the rotary arcuate arm providing the opening of the globe, said hub being adapted to rotate round the foot 1 between the plate 1a rigid with the foot 1 and the hub 9 forming the starting point of the rear incurved feet 2 and 3 which are suitably divergent.

The hub 9 is secured in its accurate position by means of a screw 9a with the interposition of an anti-friction washer 10.

Said part is followed at a predetermined distance by a sleeve 11 provided with a radial tapped port 11a, so that it may be locked in the desired position by the pivot 12 round which may freely rock the scale-carrying quadrant 6 carrying a counterweight; over the remaining section of the rectilinear foot 1, there is formed a line of sight 1d, as already mentioned. Lastly, a double jaw 13 adapted to slide and rock over the foot connects the terminal section of the front rectilinear foot 1 with the small rod 14 ending at its lower end with a sphere serving for carrying and adjusting the celestial and terrestrial globe when it is to be suitably set in direction.

The half axis 5b being structurally that carrying the North celestial and terrestrial hemispheres 4b, 4a, and, similarly, the half axis 5a being that carrying the South celestial and terrestrial hemispheres 4d, 4c, said half axes are parallel with the longitudinal axis of the front foot 1; the result thereof is that it is sufficient to direct said foot 1 in parallel with the rotary axis of the earth and to make the poles of said hemispheres face the celestial poles of the same names; this provides an accurate angular setting of the four hemispheres of the globe in accordance with my improved cosmic setting of geographical and astronomic representations.

In order to adjust the slope of the rectilinear foot, it is sufficient, in practice, to give a suitable slope to the small rod 14 and/or to make it slide inside the jaw 13, until the reading on the scale of the transparent quadrant shows an angle equal to the latitude at which the observer stands.

FIG. 6 shows a section of the northern celestial hemisphere 4b including a circumpolar area and an area of the equatorial zone of the northern sky.

The celestial hemisphere shows, in addition to the main stars arranged after the manner of the conventional constellations, the nebulae which are visible to the naked eye and the other celestial objects, the ecliptic and the galactic circle, while cutting out any material representation of the latter as the Milky Way. The celestial equator may carry various comparative scales, for instance subdivisions into hours and minutes of right ascension and degrees of GHA and of SHA, which two latter scales are those adopted, as well-known, in the naval and aerial almanacs. It is also convenient, as far as colors are concerned, to paint the celestial hemispheres in light sky blue, while the meridians and parallels are drawn in whitish lines, the stars being shown in dark yellow, exceptions being however possible, say for Vega, Aldebaran, Sirius, Canopus, etc. The lines defining geometrically the constellations may appear in black and are interrupted at the crossings with parallel and meridian lines.

For teaching purposes, it is possible to design special celestial hemispheres showing particularly predetermined celestial objects.

Turning again to FIG. 6, the rotary guiding support 15 is inwardly protected by a spherical polar cap 16 engaging the celestial hemisphere and made of the same material, preferably a suitable plastic material.

In the case of highly accurate globes, it is necessary for the thickness S1 of each hemisphere in the vicinity of the poles to be smaller than the thickness S2 of the free equatorial edge, so as to form an inner surface which is spherical and an outer surface which is that of a geoid.

The cap 16 over which the celestial representation continues without any interruption takes part in the rotation of the corresponding hemisphere and it merely allows the passage with the minimum clearance of the stationary half axis 5b which, in contradistinction, does not take part in the rotation. Said half axis materially showing the rotary axis of the earth is provided at its free inner end with a thread or the like securing means for insertion therein when the globe is open, with the interposition of a bush, of a small sphere 17 (FIG. 7), in a manner such that the latter is concentric with the corresponding hemisphere. Said small sphere representing the earth is mounted loose on the bush rigid with the half axis 5b and is provided with crossed radial bores, so as to provide for the desired cardan suspension of the circle 18 forming the artificial horizon.

As shown in FIGS. 7 and 9, the circle 18 has an outer radius R1 which is slightly smaller than the radius of the celestial hemisphere R2 and it is carried by two spokes 19 and 20 and it is furthermore associated with a semi-circle 21 forming a counterweight, so as to maintain the circle 18 permanently in a horizontal plane; said lower semi-circle 21, the radius of which is slightly smaller than that of the circle 18, does not disturb the visibility of the part of the hemisphere which lies underneath the horizon. In order to accurately set the artificial horizon and to compensate for any possible structural inaccuracy, the counterweighted semi-circle may be shifted out of the normal setting at 90° with reference to the plane of the horizontal circle 18 and, furthermore, the counterweight 21a may slide along the semi-circle 21. When not in use, the counterweighted circle is collapsed into the plane of the circle 18.

FIG. 8 shows the orbit-forming auxiliary illustrating over the surface of the celestial hemisphere the trajectory followed by a meteor such as 23 and the path of an artificial satellite such as 24 and the like lines of interest with reference to the cosmos. To this end, the inner free end of the half axis 5b carries, as precedingly, at its inner free end a small sphere provided with a system of radial bores extending in correspondency with predetermined coordinates. From said bores, the various path-illustrating elements and/or the like circles are fitted.

To ensure the rigid securing between the northern and southern terrestrial hemispheres when the globe is closed, it is of advantage to form along the equatorial edge of each hemisphere a succession of recesses 25 and projections 26 arranged in staggered formation with reference to the corresponding recesses and projections of the other hemisphere, so as to allow their interengagement; said sort of castellation is distributed in accordance with the scale of meridians and forms part of said scale. The teeth provided for said equatorial interengagement are obviously of a reduced length and their engagement is ensured by a spring carried by them and acting on the rotary section of the other hemisphere.

My improved globe is easy to operate, since it is sufficient to provide for its accurate angular setting while the terminal eye 1c of the arcuate stationary arm rigid with the rear foot 1 should carry the celestial and terrestrial hemisphere showing the pole of the real hemisphere on which the observer stands. If said coincidence of the poles is not obtained, the hemispheres should be interchanged, or else, the globe is merely turned upside down in the case of a purely geographical representation without any opening of the globe being provided.

If the latitude of the point of observation of the geographical hemisphere of the observer is not known, it should first be ascertained, so as to allow giving the front foot 1 a slope by an angle equivalent to the latitude of the point of observation; this is done by resorting to the scale on the transparent quadrant, said quadrant being directed towards the celestial pole of the same name as the geographical hemisphere of the observer.

When it is desired to examine the celestial globe, the perfectly accurate angular setting already obtained is retained and it is sufficient to act on the locking pin 1e and to simultaneously disconnect the hemispheres through a slight upward tractional stress, whereupon the lower hemisphere will turn and assume, through gravity, with a slight lateral push, its correct position and its correct angular setting in which it is again locked by said pivot or pin 1e.

Figure 11:
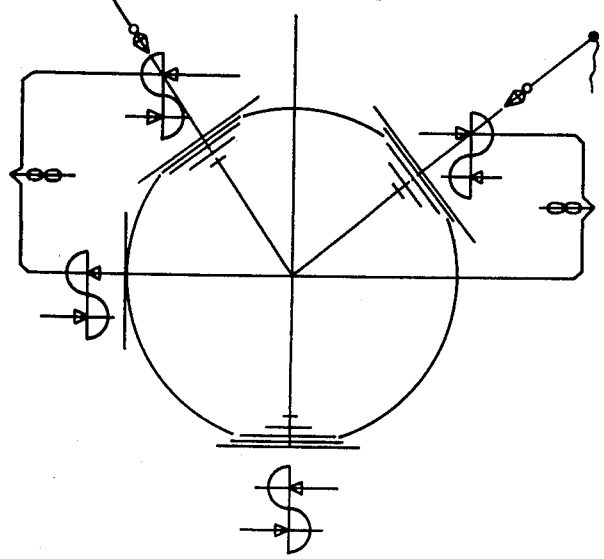
FIG. 11 is a diagrammatic showing of various manners of correctly setting the globe for various northern and southern latitudes at which a celestial and terrestrial globe or a simple terrestrial globe may be used.
Figure 10:
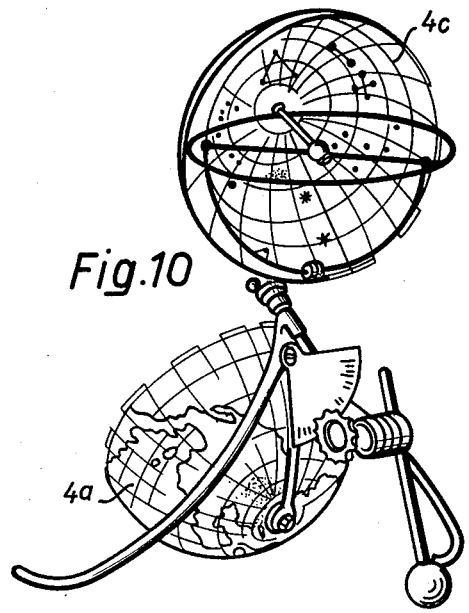
FIG. 10 is a general view of the open celestial and terrestrial globe set for a southern latitude and cooperating with an artificial horizon.
Figure 12:
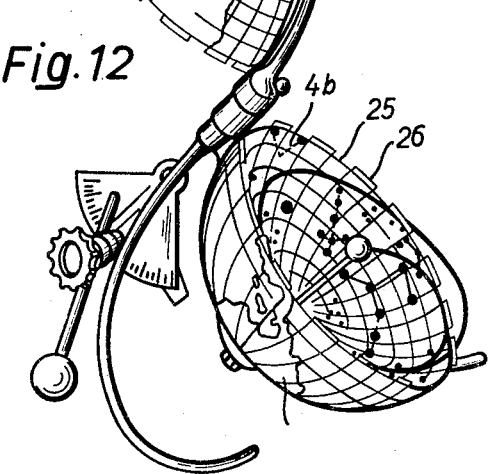
FIG. 12 is a general view of the celestial and terrestrial globe considered in the case of FIG. 11, showing more particularly the northern celestial hemisphere and incorporating a replica of an orbit.

The artificial horizon described hereinabove is then mounted, as illustrated in FIG. 10 and also the orbit-forming auxiliaries, as shown in FIG. 12. It may be of interest to sum up the manner of using and observing the globe at different latitudes, as illustrated in FIG. 11, in order to obtain the desired perfectly accurate angular setting of the globe.

When the observer is at the equator, the hemispheres should be arranged horizontally with the concavity of the south celestial hemispheres directed towards the north, so as to be correctly inspected in the direction illustrated by the arrow at said point. The northern celestial hemisphere will be apparent to view so as to be observed in the direction of the opposite arrow.

For a northern latitude, corresponding for instance to that of Greenwich, the North Pole should be the upper pole, as obvious and as conventionally done, while, for a southern latitude such as that of Montevideo, the South Pole should be the upper pole, in contradistinction with conventional operation.

My invention covering the principle of a perfectly accurate setting as claimed in the accompanying claims may however, within the scope of the latter, be different in its structural details and in its execution from the embodiment disclosed.

What I claim is:

1. An article illustrating the celestial and terrestrial spheres, comprising a globe, the outer surface of which carries a representation of the actual terrestrial sphere and the inner surface of which carries a representation of the celestial sphere, a tripod including a rectilinear front foot carrying a line of sight parallel with its axis, two rear arcuate feet, means for adjusting the slope of the front foot to aline its axis with the line connecting the celestial poles in space, an arcuate arm rigid with the tripod and a rotary arcuate arm pivotally secured to the front foot round an axis parallel with the line of sight on the latter, said arcuate arms carrying each one of the hemispheres and holding it with its polar radius parallel with the line of sight, said polar radii lying at the same distance from the axis of the front foot to allow the angular relative shifting of the two hemispheres into and out of engagement to allow at will the formation of a closed sphere and inspection of the inner surface of the disengaged hemispheres.

2. A globe illustrating the celestial and terrestrial spheres, comprising a globe, the outer surface of which carries a representation of the actual terrestrial sphere and the inner surface of which carries a representation of the celestial sphere, a tripod including a rectilinear front foot carrying a line of sight parallel with its axis, two rear arcuate feet, a quadrant adapted to rock round a pivot perpendicular to the axis of the front foot and carrying a scale of 0 to 90° concentric with the pivot, a counterweight rigid with said quadrant to constrain the latter to lie normally in a position for which the radius leading from the center of the quadrant to the zero of the scale is horizontal, the subdivision of the scale registering with the line of sight showing the actual slope of the rectilinear front foot and a carrier member pivotally secured to the lower end of the rectilinear foot and the angle of which with reference to said foot is adjustable so that the tripod resting on the ground through said carrier member and rear feet makes the rectilinear foot register with the subdivision of the quadrant corresponding to the latitude of the point at which the globe is used, an arcuate arm rigid with the tripod and a rotary arcuate arm pivotally secured to the front foot around an axis parallel with the line of sight on the latter, said arcuate arms carrying each one of the hemispheres and holding it with its polar radius parallel with the line of sight, said polar radii lying at the same distance from the axis of the front foot to allow the angular relative shifting of the two hemispheres into and out of engagement to allow at will the formation of a closed sphere and inspection of the inner surfaces of the disengaged hemispheres.

3. An article illustrating the celestial and terrestrial spheres, comprising two hemispheres forming a globe, the outer surface of which carries a representation of the actual terrestrial sphere and the inner surface of which carries a representation of the celestial sphere, means for supporting said hemispheres for relative rotation about an axis perpendicular to a plane passing through the equatorial line of said globe from a globe forming position to a side by side position in which relative directions in the hemispheres remain unchanged and means for simultaneously obtaining a correct setting of said four representations of the actual terrestrial sphere and of the celestial sphere upon correct setting of one of the latter.

4. An article illustrating the celestial and terrestrial spheres, comprising two hemispheres forming a globe, the outer surface of which carries a representation of the actual terrestrial sphere and the inner surface of which carries a representation of the celestial sphere, means for supporting said hemispheres for relative rotation about an axis perpendicular to a plane passing through the equatorial line of said globe whereby said hemispheres are rotatable to a side by side position in which relative directions in the hemispheres remain unchanged, and means for simultaneously obtaining a correct setting of said four representations of the actual terrestrial sphere and of the celestial sphere upon correct setting of one of the latter, said representation of the terrestrial sphere including an equatorial line, a pole and reference numbers indicating the longitudes and latitudes provided on each hemisphere and arranged to appear right-side-up when viewed from the equatorial line towards said pole.

References Cited in the file of this patent

UNITED STATES PATENTS

| | | |
|---|---|---|
| 29,229 | Agnew | July 24, 1860 |
| 336,280 | Bailey | Feb. 16, 1886 |
| 2,372,487 | Hagner | Mar. 27, 1945 |
| 2,382,643 | Lafferty | Apr. 14, 1945 |

FOREIGN PATENTS

| | | |
|---|---|---|
| 218,527 | Great Britain | July 10, 1924 |